United States Patent [19]

Stolzer

[11] Patent Number: 5,281,070
[45] Date of Patent: Jan. 25, 1994

[54] SHELF SERVICE APPARATUS IN THE FORM OF A GANTRY CRANE, FOR A MATERIAL STORE FOR ROD-SHAPED MATERIAL

[75] Inventor: Armin Stolzer, Renchen, Fed. Rep. of Germany

[73] Assignee: KEURO-Maschinenbau GmbH & Co. KG, Achern-Gamshurst, Fed. Rep. of Germany

[21] Appl. No.: 841,373

[22] Filed: Feb. 25, 1992

[30] Foreign Application Priority Data

Apr. 25, 1991 [DE] Fed. Rep. of Germany ... 9105077[U]

[51] Int. Cl.⁵ .............................................. B65G 1/04
[52] U.S. Cl. ................................... 414/281; 414/277; 414/745.1; 211/60.1; 294/81.6
[58] Field of Search ............... 414/277, 281, 798.1, 414/797.5, 286, 268, 674, 795.2, 266, 267, 273, 745.7, 745.1, 749, 667, 663, 664, 668, 626, 627; 364/478; 211/60.1, 69, 70.4; 294/81.51, 81.6, 81.61

[56] References Cited

U.S. PATENT DOCUMENTS

| | | | |
|---|---|---|---|
| 3,765,546 | 10/1973 | Westerling | 414/797.5 X |
| 3,977,542 | 8/1976 | Stolzer | 414/281 X |
| 4,252,486 | 2/1981 | Soligno | 414/277 X |
| 4,372,724 | 2/1983 | Stolzer | 414/281 |
| 4,778,325 | 10/1988 | Stolzer et al. | |
| 5,051,051 | 9/1991 | Grabill | 414/277 X |

FOREIGN PATENT DOCUMENTS

| | | | |
|---|---|---|---|
| 2414894 | 10/1975 | Fed. Rep. of Germany | 414/797.8 |
| 3012826 | 10/1981 | Fed. Rep. of Germany | 414/281 |
| 417414 | 2/1967 | Switzerland | 414/281 |

Primary Examiner—Frank E. Werner
Attorney, Agent, or Firm—Frishauf, Holtz, Goodman & Woodward

[57] ABSTRACT

The invention provides shelf service apparatus in the form of a gantry crane (7), for a material store for rod-like material which may be accommodated in self-supporting magazines (5), where the material store comprises stacking frames arranged transversely of, and aligned with one another in, the storage space direction and separated from one another by lanes for material transport. These frames are provided in the manner of shelving units with carrier arms (4) arranged one above another, extending in the direction of the storage space and secured on vertical shelving supports (2), for the material or the magazines. The gantry crane, which bridges over the material store and is mobile in the direction of the storage space, comprises vertical crane supports (8), on which the carrier brackets (14) are movable up and down by means of a carriage (17), the carrier brackets being arranged to extend horizontally, in operation, into the region of the material store for moving the material up and down, by means of a load cross-piece carried by the carrier brackets or by grasping the ends of the magazines, and transversely of the lanes and in them. The carrier brackets are of T-shaped formation, a carrier beam being formed by the transverse bar (31) of the T-section and the longitudinal bar (32) of the T-section being pivotably mounted on the respective carriage, such that the carrier brackets (14) are pivotable upwardly and thus capable of being brought out of the region occupied by the shelving units.

11 Claims, 10 Drawing Sheets

SHELF SERVICE APPARATUS IN THE FORM OF A GANTRY CRANE, FOR A MATERIAL STORE FOR ROD-SHAPED MATERIAL

Reference to related patent, the disclosure of which is hereby incorporated by reference: U.S. Pat. No. 4,778,325, Stolzer and Blust.

Reference to related application, the disclosure of which is hereby incorporated by reference, and assigned to the assignee of the present application: U.S. Ser. No. 07/841,371, filed Feb. 25, 1992.

FIELD OF THE INVENTION

The invention relates to a shelf servicing apparatus, in the form of a gantry crane, for a material store, e.g. storage yard or storage shed, especially for rod-shaped material which may be accomodated in self-supporting magazines or pallet boxes.

BACKGROUND

A material store is known, which has stacking frames arranged transversely of, and aligned with one another in storage space direction. They are separated from one another by lanes for material transport. The frames include shelving units with carrier arms arranged one above another, extending in the direction of the storage space and secured on vertical shelving supports for the material or the magazines. The gantry crane, which bridges over the frames of the material store and is mobile in the direction of the storage space has vertical crane supports. Carrier brackets are movable up and down on the crane supports by means of carriages or cages. The carrier brackets extend horizontally into the region of the material store for moving the material up and down, by means of a load cross-piece carried by the brackets or by grasping the ends of the magazines or pallet boxes. The gantry crane is movable in the lanes, as well as transversely of the lanes.

In known apparatus of this nature the carrier brackets can lift the magazines containing the material out of the shelving compartments formed by the carrier arms, move them horizontally into the lanes, then drive them up in the lanes and finally bring them over the top of the material store to a position where by renewed lowering, for example in a lane, they can be brought to an apparatus for further handling of the material in rod form.

As shown in U.S. Pat. No. 4,778,325, Stolzer and Blust, the possibility also exists of employing the carrier brackets for taking up a rod material support beam. The support beam extends across the crane and is equipped over the length of the rod-like material with fork-like prongs, so that with the aid of this cross-piece or beam it is possible to take out of the shelf compartments individual rod-like material which has been deposited individually in the compartments and to transport such material further in the above-described manner.

The known apparatus have proved their value, especially in as much as they are versatile in use, namely equally for material in rod form contained in magazines and also, with the aid of the load cross-member, for material deposited singly in the shelf compartments.

It is however disadvantages that the shelf compartments and magazines deposited in them must be freely accessible for the carrier brackets over their full area of the magazine ends, with which the necessity is combined of accommodating the shelf unit supports sufficient cross-section necessary for the load carrying capability formation of the shelf units within a region lying between the shelving compartments arranged on both sides of the shelf support. This results in a relatively great width of the shelf supports in the storage space direction. A correspondingly wide formation of the shelving supports is also necessary transversely of the storage space direction and in the longitudinal direction of the material. This requires considerable space in each case in the longitudinal direction of the storage space, which in the case of a more extensive material store is correspondingly added over several shelving units arranged in the longitudinal direction of the storage space. However, transversely of the longitudinal direction of the storage space this also requires corresponding space, which necessitates a corresponding width of span of the gantry cane, which is compounded due to the conditions existing equally on both sides of each shelving unit.

A further disadvantage of the known apparatus consists in that the carrier brackets which are fitted on the crane supports as rigid even though upwardly and downwardly movable structures, may be driven not only during the handling of the material that may possibly be contained in magazines, in their transport only over the shelf units in the longitudinal direction of the storage space, but that they must also travel the same paths on empty journeys.

THE INVENTION

It is an object of the invention to improve the apparatus of the kind as initially stated in such a way that full accessibility of the magazine ends is no longer necessary, while on the other hand for movement of the gantry crane without a useful load, a diagonal movement in relation to the carrier brackets and in the longitudinal direction of the storage space should also be rendered possible, that is, the prior requirement of moving the carrier brackets only over the top of the shelf unit arrangement from one shelf unit lane to the other should no longer obtain.

Briefly, in accordance with the invention, the carrier brackets are T-shaped. The cross-piece of the T-section forms a support element for a magazine or the material support cross piece. The support brackets are pivotably mounted by a pivot on the longitudinal bar of the T-section in such a way that they are vertically pivotable, e.g. upwardly, through 90°, and thus may be brought out of the region occupied by the shelving units.

By virtue of these measures according to the invention the unhindered handling of magazines or individual material rods with the aid of the load cross-piece is possible, due to the T-shaped formation of the carrier brackets, even when the magazine ends are partially covered by externally lying shelving unit supports, since the cross-piece of the T-section of the carrier brackets can move behind the shelving unit supports and thus can engage in particular the full width of the ends of magazines.

Due to the fact that the carrier brackets are hingeable upwardly out of the shelving unit area, on the other hand, it is made possible for the gantry crane to be driven in the longitudinal direction of the storage place, with the carrier brackets hinged upwardly, irrespective of which height position the carrier brackets assume at that moment. Thus, however, it is also made possible in such driving of the gantry crane with hinged-up carrier brackets to transfer the carrier brackets at the same time into such a height position as is suitable for the next operation, that is, for the next taking up of material.

Expediently, the externally situated shelving supports are made substantially flat in relation to their horizontal cross-section transversely of the direction of the storage space, and so as to partially overlap the end side region of the magazines or the shelving compartments formed by the carrier arms in the direction of the storage space. By this measure embodied in the invention the object is achieved that, with regard to the accommodation of their requisite cross-section, the externally situated shelving unit supports can in part be extended to the region occupied by the shelving compartments, so that the compartments of a shelving unit can be pressed closer together on both sides of the shelving unit supports. Considerable space is thus gained in the longitudinal direction of the storage space, which can either serve for a reduction of size of a specific store of material, or render possible the accommodation of a greater number of shelves in a specific place. At the same time, however, the span width of the gantry crane can also be reduced transversely of the storage space longitudinal direction.

In the case of a material store of the above-described kind the problem further exists of being able to carry this out transversely of the storage space longitudinal direction by further auxiliary means in the lower region, in order to be able to insert and withdraw material at specific points transversely of the storage space longitudinal direction. This is possible only if the rails of the gantry crane extend above the floor. Without special measures, however, in this case on all shelving units, by reason of the raised rails of the gantry crane, the possibility of fitting shelving compartments in the lower shelving unit region would be eliminated. In order to counter that, it is expedient, in a further preferred embodiment of the invention that at least one of the carriages is vertically mobile on a guide section which in turn is guided vertically movably on the associated crane support, the mobility of the carriage being limited by a stop on the upper end of the guide section, while the mobility of the guide section is limited by stop means in such a way that it is not completely drivable downwards out of the associated crane support.

In this way, at least one of the crane supports can be equipped with an elevated roadway, while on the other hand, however, the carrier bracket is displaceable into the region beneath the elevated roadway, so that the shelf units can also be fitted with shelving compartments and served even beneath this elevated roadway.

Regarding the more detailed construction of the carrier brackets, advantageously the carrier brackets carry, on their longitudinal bar, in the region outside the shelving units, a toothed segment having an angle of more than 90°, and a rack on the carriage of the carrier brackets and in engagement with the toothed segment is vertically movably guided and adjustable by drive means. In this way a stable pivot mounting of the carrier brackets and handling of their pivot movement result.

Furthermore, expediently the support beam of the carrier brackets is provided at both ends with noses for the lateral adjustment of the magazines or of a load cross-piece. This adjustment serves not only for the exact grasping of the magazine concerned, or of a load cross-piece, but it also renders possible rapid accelerations of the gantry crane in the longitudinal direction of the storage space when a magazine driven into the overhead region of the shelf units, or a load beam driven there, is to be moved in the longitudinal direction of the storage space.

Furthermore, it may also be advantageous for the longitudinal bar of the T-section of the carrier brackets to include further means for the adjustment of a load cross-piece in the longitudinal direction of the material. While the grasping and adjustment of the magazine by the carrier brackets is not tied to excessive accuracy, such is, however, the case when rod material is to be grasped and moved singly with the aid of a load cross-piece, since such rod material as a rule is handled very precisely, its position in length especially having a part to play, in order to precisely grasp the end sections of material rods and also already partially consumed rods, as regards their precise positioning.

As regards the pivotability of the carrier brackets, preferably a stop screw is arranged adjustably and securably on the free end of the longitudinal bar of the T-section, and when the bracket is hinged out the stop screw is in abutment on a stop formed by the carriage.

The carriage may comprise two vertical side pieces extending in the direction towards the shelving units, on the lower ends of which the carrier bracket arranged between the side pieces is pivotably mounted, and on the upper ends of which acts, through a plate secured between the side pieces, a lifting means for the carriages.

The carrier brackets may further comprise equipment for positional control, ascertaining of weight of the taken-up material, etc. It is especially advantageous specifically for such sometimes delicate equipment that on empty journeys the carrier brackets are hingeable upwardly out of the shelving region, since thus this equipment is situated between carriage and hinged-up carrier bracket, and thus in a protected region.

DRAWINGS

The invention is described further, by way of example, with reference to the accompanying drawings, wherein.

DETAILED DESCRIPTION

Figure 1:
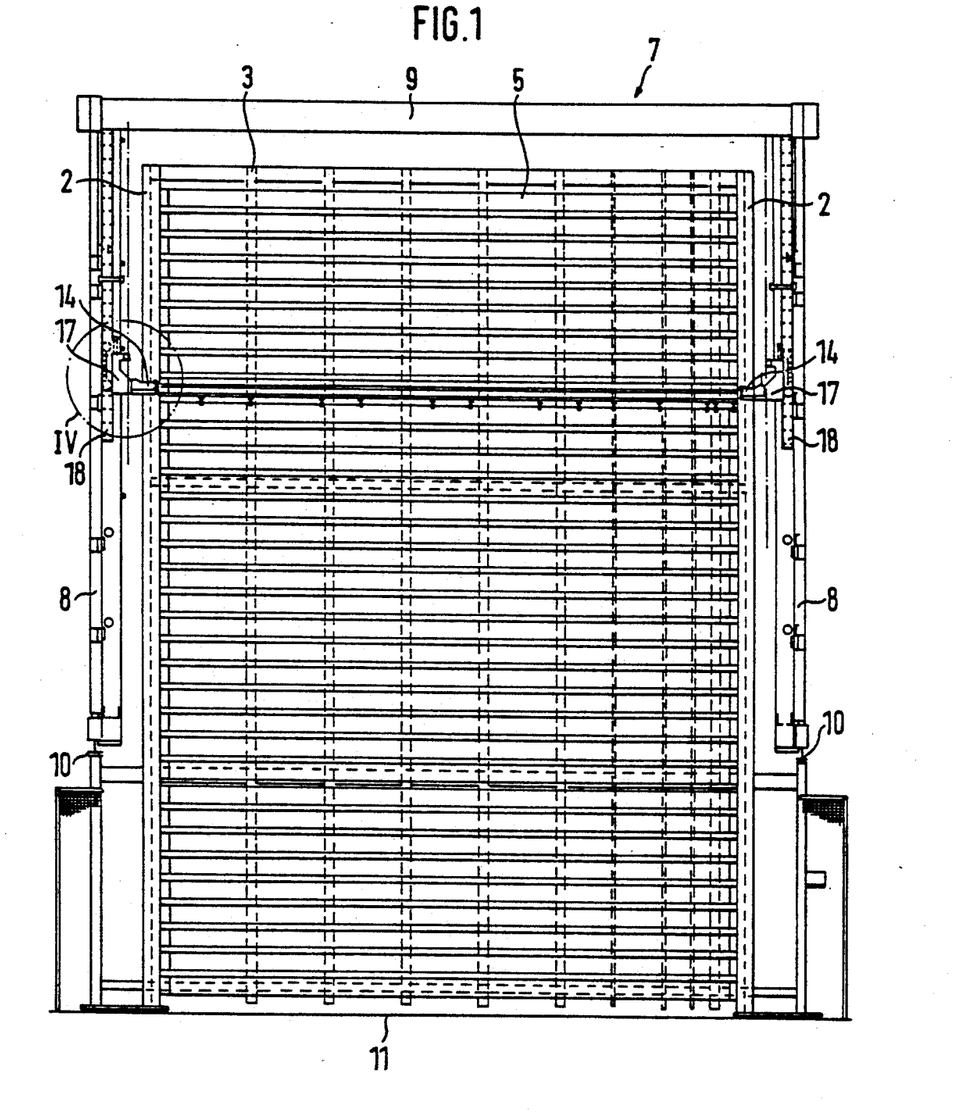
FIG. 1 shows a cross-section through a material store with a view in the longitudinal direction of the storage space and a view of a shelf unit which is filled with magazines.
Figure 2:
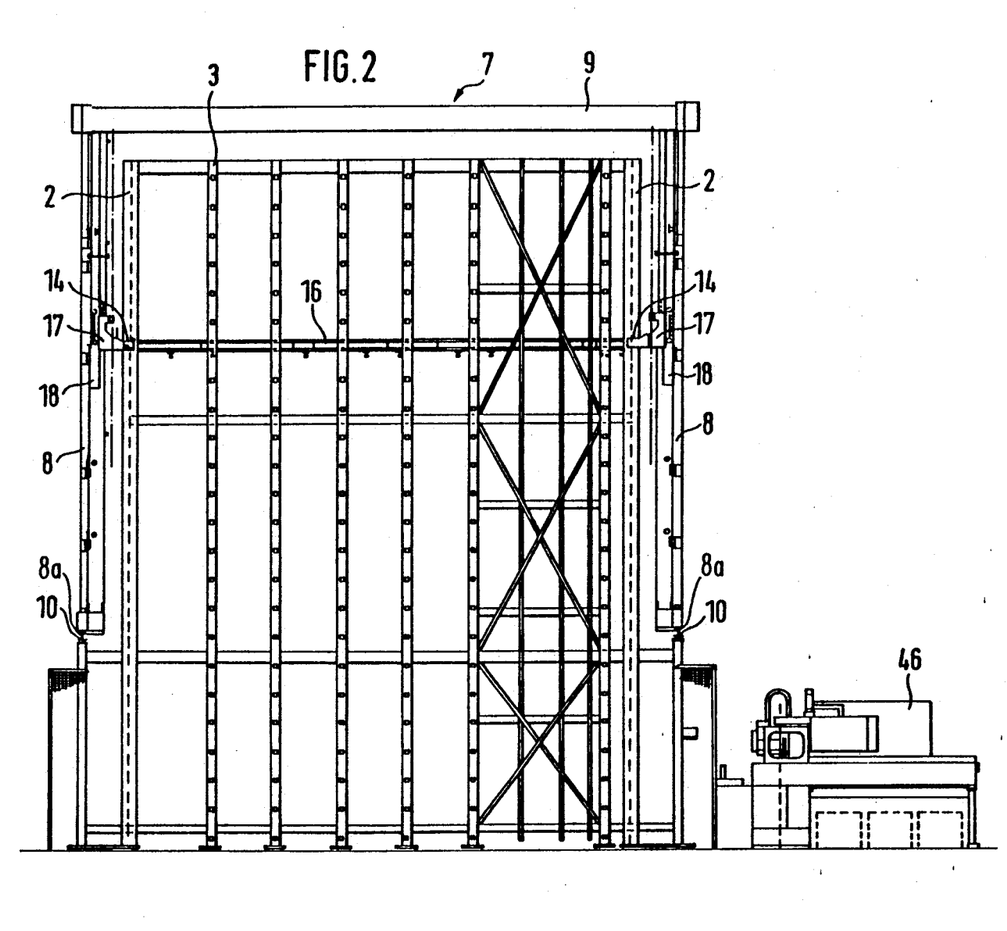
FIG. 2 shows a cross-section through a material store with a view in the longitudinal direction of the storage space and a view of a shelving unit for loosely inserted material in rod form, this material not being represented.
Figure 3:
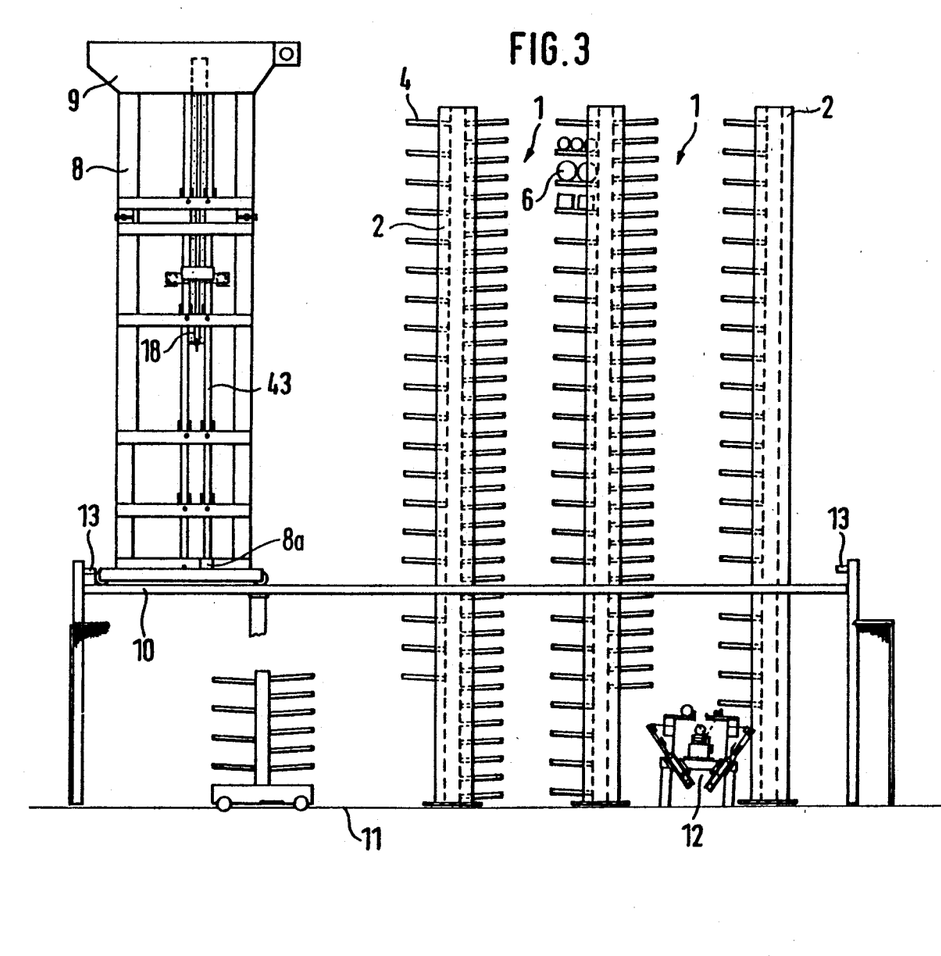
FIG. 3 shows the simplified lateral elevation of a material store, without magazines or rod material.

FIGS. 1 and 2 show a material store for material in rod form in two sections placed transversely of the longitudinal direction of the storage space and according to FIG. 3 in a side view or lateral elevation. The illustrations are simplified for clarity of lay-out.

As may be seen from FIGS. 1 to 3, the material store contains any desired number of shelving units arranged side by side in the longitudinal direction of the storage space, leaving a lane 1 (FIG. 3), which units consist of stacking frames formed by outer shelving unit supports 2, inner shelving unit supports 3 and carrier or support or bracket arms 4 secured thereto. As can be seen from FIG. 3, the carrier arms project into the adjacent lane 1. The arms 4 on the supports 2 and 3 define the shelving units or compartments arranged one above another on both sides of the supports of the individual shelving units.

In the shelving compartments, magazines 5 may be set on the carrier arms 4, as shown in FIG. 1, but the possibility also exists of insertion rod material 6 loosely into the shelving compartments, as illustrated by way of example in FIG. 3.

The magazines 5 have horizontally placed U-shaped rails at their ends. The lower, horizontal legs of the U are seated on the carrier arm sections, of L-shaped formation of the outer shelving supports 2. The magazines can be picked up and transported by engagement with the upper horizontal legs of the U-sections, as will be described below.

Figure 7:
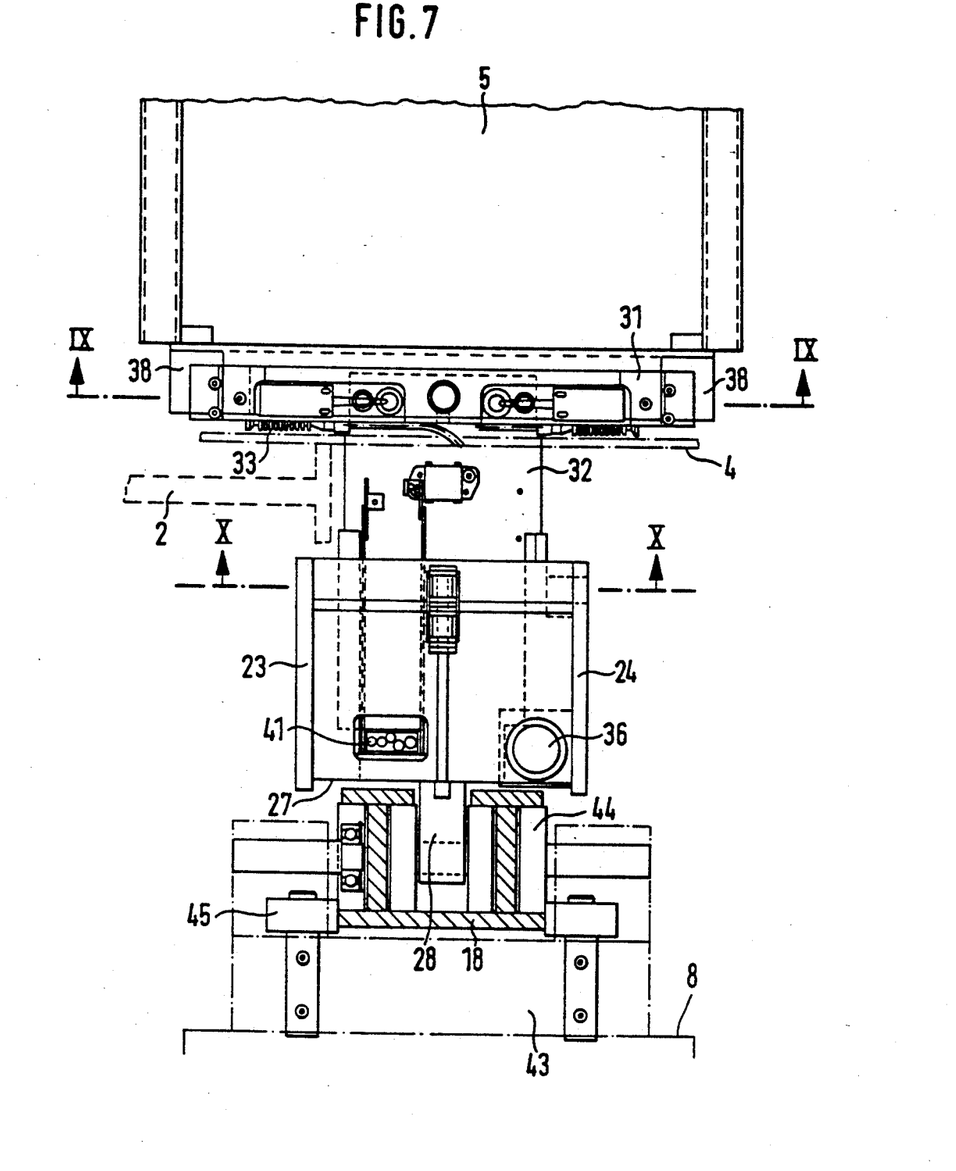
FIG. 7 shows a plan view of the subject of FIG. 4.

As may be seen especially from FIG. 3, the outer shelving supports 2 partially cover over the compartments formed by the carrier arms 4, and as may be seen, especially from FIG. 7, are made narrow transversely of the longitudinal direction of the storage space so that by this arrangement of the outer shelving supports 2 space is saved transversely of the longitudinal direction. The supports 2 receive a larger cross-section in the longitudinal direction. This larger cross-section in the longitudinal direction, however, also permits having the carrier arms on both sides of each shelving unit begin closely side by side so that the shelving units occupy less space in the longitudinal direction of the storage space than was the case hitherto.

A gantry crane 7, having crane supports 8 and a head part 9 connecting the supports 8 above the shelving units, is mobile above the unit formed by the shelving units arranged side by side in the longitudinal direction of the storage space. The crane supports are mobile at the bottom on rails 10, which are arranged a considerable distance above the floor 11 of the installation. This arrangement permits bringing rod material beneath these rails 10 out from the shelving unit region and hauling back rod material again, in the longitudinal direction of the rod material, for example by a storage insertion and withdrawal station 12 which can be seen from FIG. 3.

Stops 13 on the ends of the rails 10 serve to limit the travel distance of the gantry crane 7, as shown by FIG. 3.

Carrier brackets 14 are vertically movable by lifting means 15 on the crane supports 8, as may be seen from FIGS. 1 and 2, and FIGS. 5, 6 and 11, by which the individual magazines 5 can be taken up by their terminal U-sections; or, with the aid of a cross-piece 16, as known from the U.S. Pat. No. 4,778,325, as seen in FIG. 2, individual pieces of rod material 6 located in appropriate shelving units can be engaged.

The carrier brackets 14 are seated on carriages 17 which are vertically movable along guide sections 18 on the crane supports 8, these guide sections 18 likewise being vertically movable on the crane supports. The length of the guide sections is dimensioned so that they can bridge over the interval between the rails 10 and the floor level 11. The telescopic mobility of the carriages 17 occurs as follows:

Carriage 17 is slidable in guide sections 18 between upper and lower stops 18a, 18b, shown only schematically. If the carriages 17 are lowered by the hoisting means 15 along the crane supports 8, the guide sections 18 reach a point at the foot of the crane supports 8 where the guide sections with the stops 18b fitted on their lower ends run up to the foot point stop 8a of the crane supports. The length of the guide sections 18 extends into the region between rail 10 and floor 11. If the carriages 17 are lowered further by the hoist means 15, they move along the lowered guide sections 18 and they can bridge over the zone between the rail 10 and the floor 11. The arrangement is similar to a suspension file drawer slide.

On lifting the carriages 17 by the hoist means 15, the carriages first run up on the guide sections 18, then come against stop means at the upper end of the guide sections and then in their further journey upwards entrain the guide sections 18, by means of these stop means.

Figure 4:
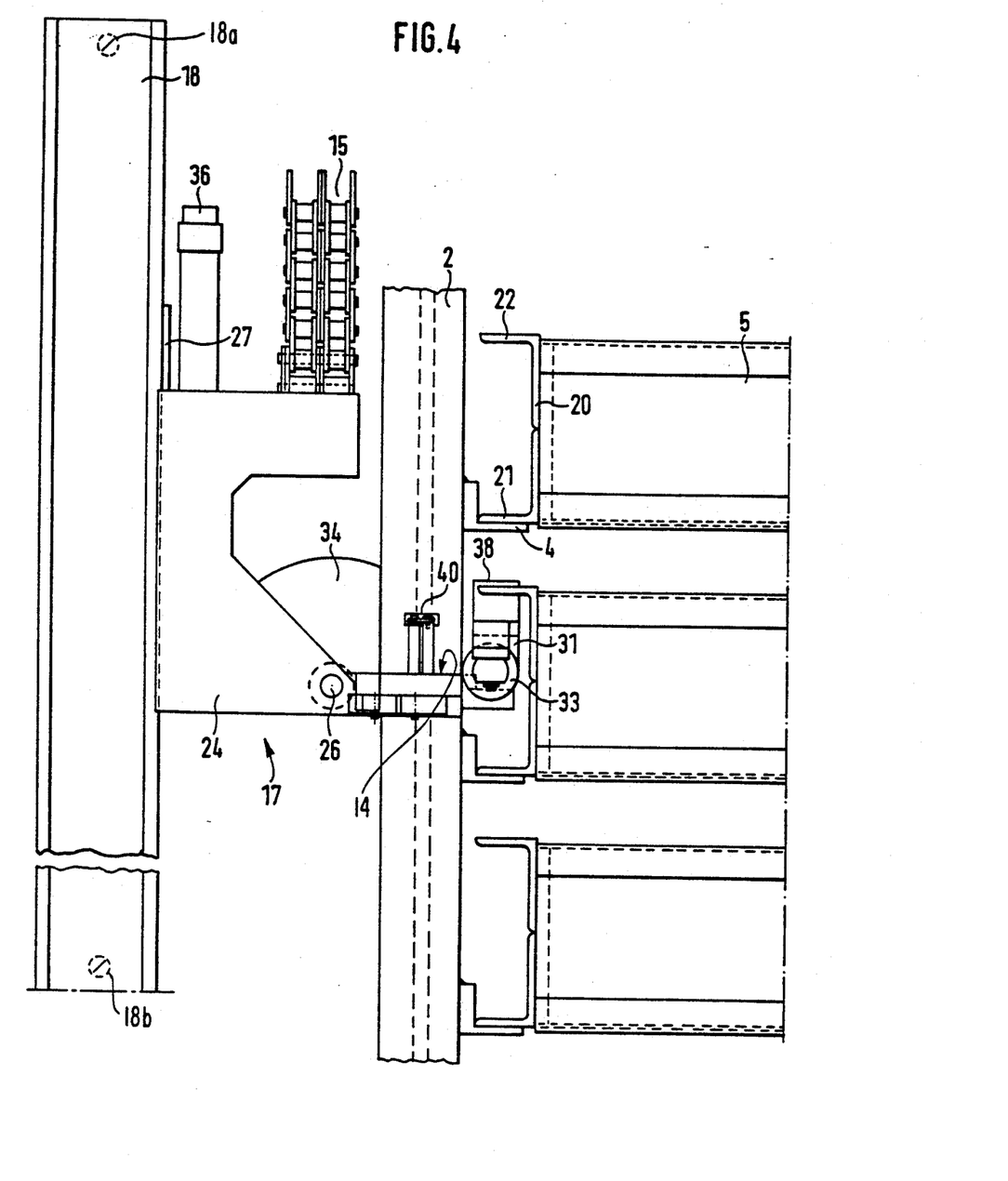
FIG. 4 shows the detail IV in FIG. 1 on an enlarged scale, the crane supports being omitted.

FIG. 4 shows, as an enlarged detail within circle IV of FIG. 1, a carriage 17 together with a guide section 18 and in combination with an outer shelving support, and magazines 5 deposited on carrier arms 4. FIG. 7 shows a top plan view of the detail according to FIG. 4 and FIG. 8 illustrates a carrier 17 in rear view, all other parts of the shelf service apparatus being omitted.

As initially illustrated in FIG. 4, the ends of the magazines 5 are equipped with a U-section 20 which is seated by means of its lower horizontal leg 21 on L-shaped carrier arms 4 secured on the shelving unit supports 2. The upper horizontal legs 22 of the sections 20 can be received by the carrier brackets 14.

Figure 8:
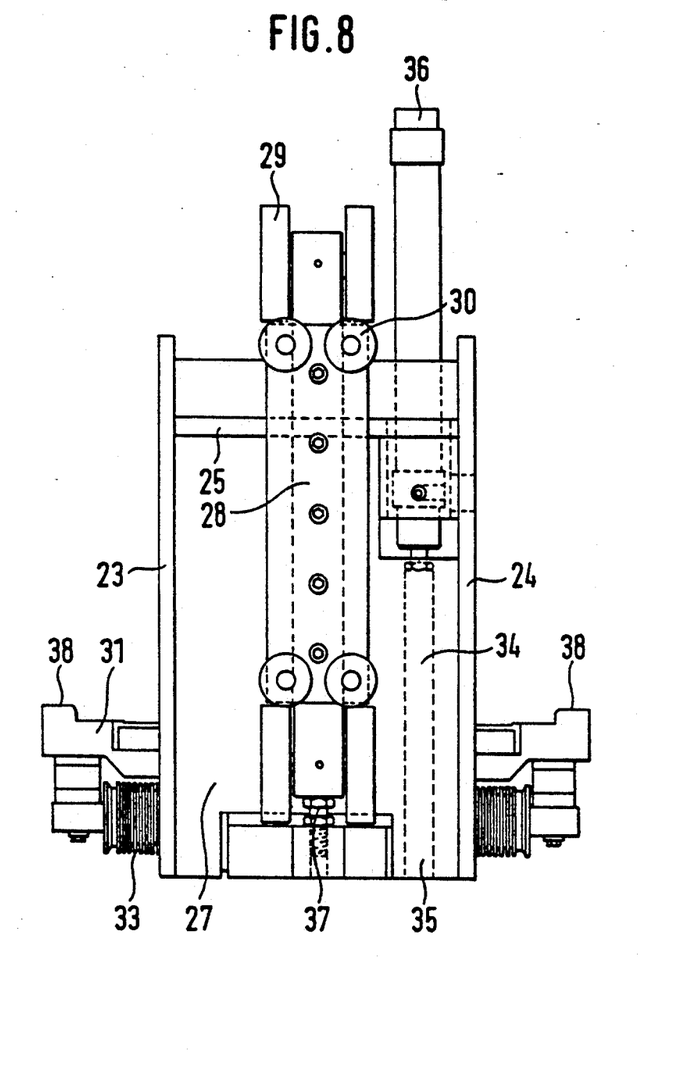
FIG. 8 shows a rear view of the carriage carrying the carrier bracket.

As may be seen from FIGS. 4, 7 and 8 in combination, the carriage 17 consists of side pieces 23, 24 which are connected with one another at the top by a plate 25 (FIG. 6) on which the hoist means, in the form of a chain 15 acts. At the lower end of the side pieces 23, 24, the carrier bracket 14 is pivotably mounted therebetween at 26 (see FIG. 4).

The carriage also has a back plate 27, starting from which a cross-piece 28 dips into the guide section 18 and carries, mounted rotatably in relation to the guide section 18, guide rollers 29 for carriage guidance transversely of the longitudinal direction of the storage space and guide rollers 30 for carriage guidance in the storage space longitudinal direction.

The carrier bracket 14 has, as visible especially from FIG. 7, a substantially T-shaped profile, whereby a front cross-bar 31 is formed, by which the magazines can be taken up by means of the upper horizontal leg 22 of their terminal U-section 20 (FIG. 4). The carrier beam 31 is seated on a longitudinal bar 32, which extends transversely of the longitudinal direction of the storage space and by means of which the carrier bracket 14 is pivotably mounted at 26 on the carriage 17.

In the present case, the carrier beam or transverse bear 31 and longitudinal bar 32 are not connected with one another fixedly but rather through a weighing device, designated generally by 33, by which the weight of the magazines 5 together with the material in rod form contained therein can be ascertained.

The carrier bracket 14, starting from the elevation according to FIG. 4, is pivotable upwardly through about 90° in such a way that it may be brought out of the shelving zone, the external contour of which is determined by the shelving supports 2.

For the execution of such a pivoting movemen the carrier bracket 14 is equipped with a toothed segment 34 which is secured on the longitudinal bar 32. A vertically displaceable rack 35 movable by a piston-and-cylinder unit 36 seated on the plate 25 is in engagement with the toothed segment 34.

Figure 11:
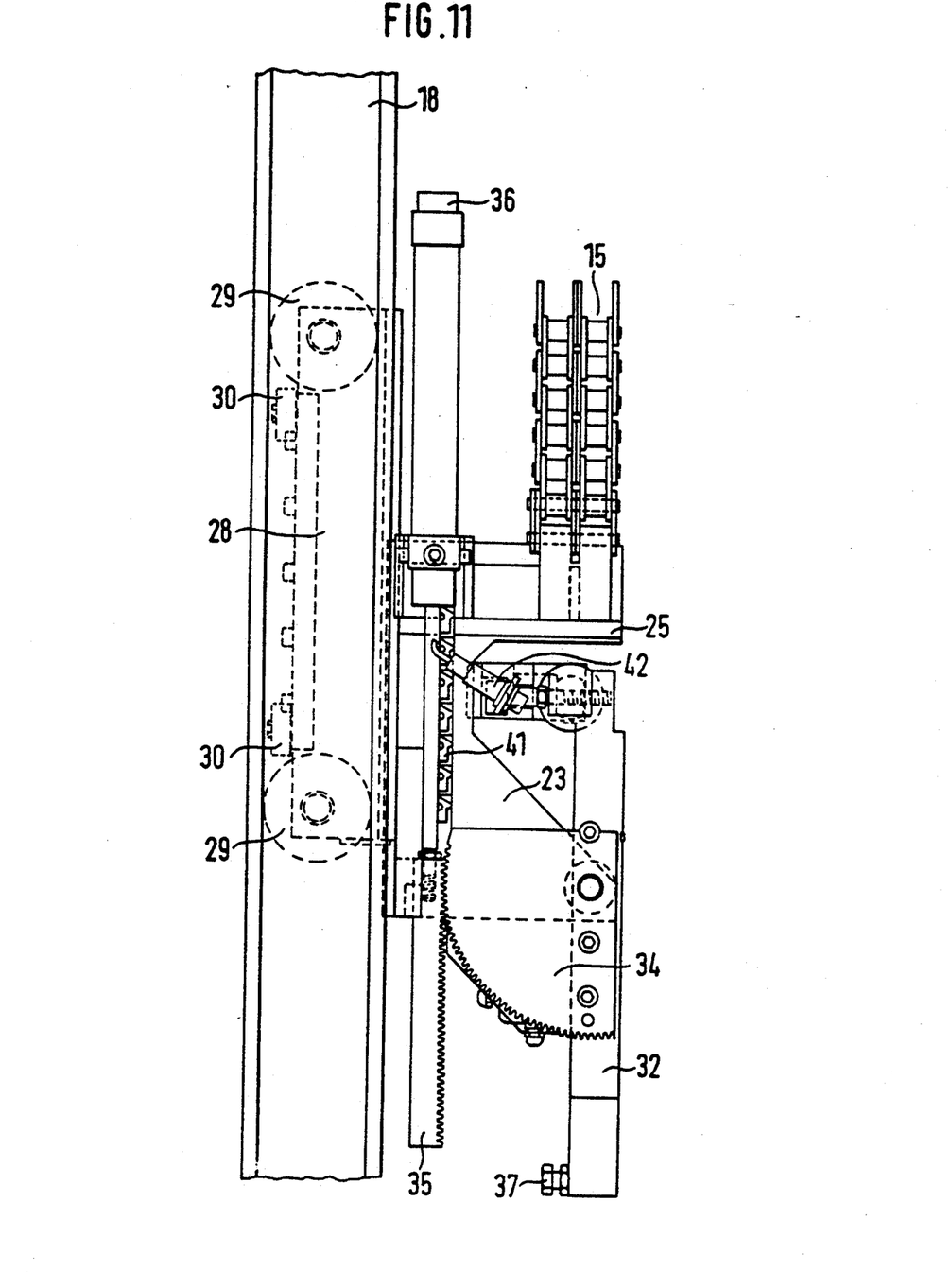
FIG. 11 shows the view according to FIG. 5, with the carrier bracket hinged up.

The illustrated pivotability of the carrier bracket 14, as visible in its pivot position especially from FIG. 11, serves to bring the carrier bracket 14 out of the region of the storage shelves so that on empty journeys of the gantry crane 7 it is not necessary to make diversions when the carrier brackets 14 can be situated only in a given position above the shelving units.

Figure 5:
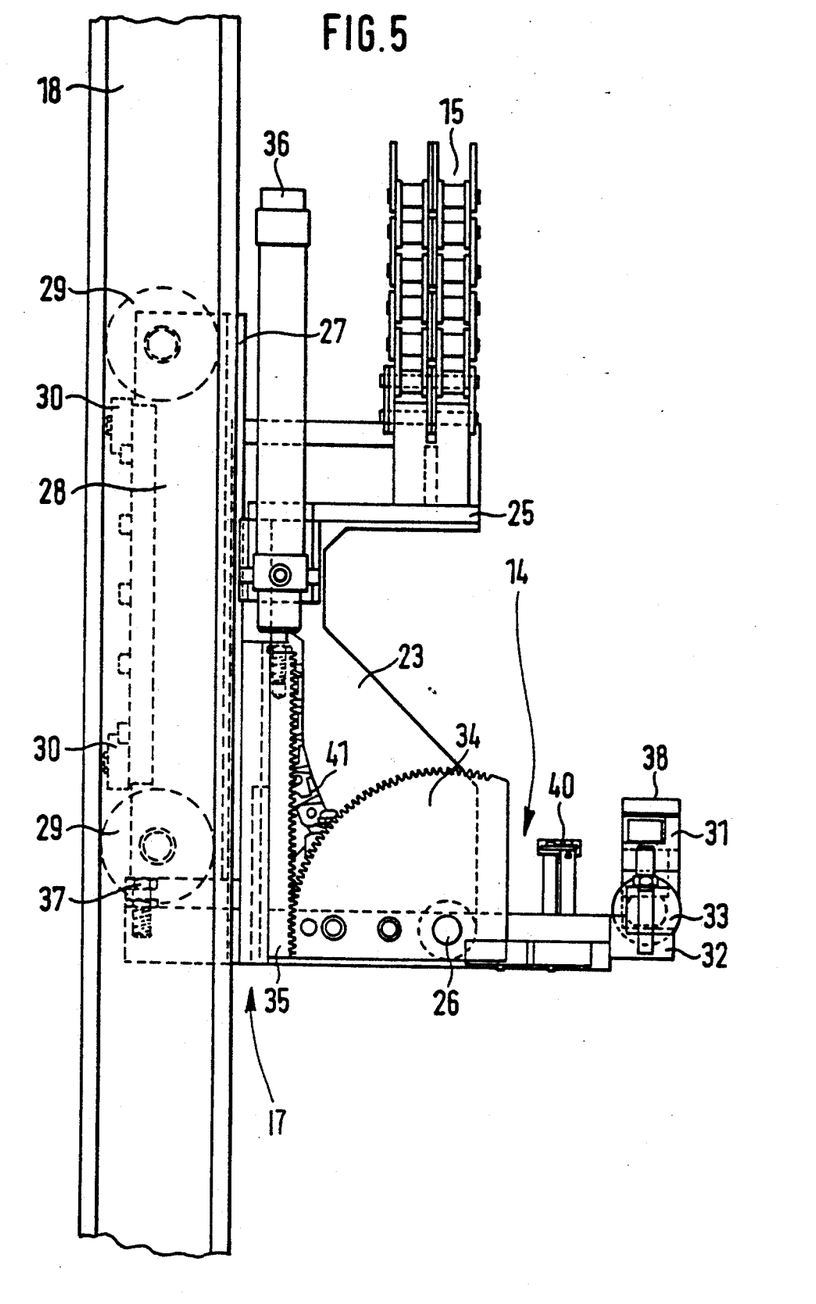
FIG. 5 shows the subject of FIG. 4, the front side piece of the carriage for the carrier bracket being omitted.

FIG. 5 shows an elevation corresponding to FIG. 4, the side piece 24 being omitted, while once again the guide rollers 29, 30 especially are visible, as are the bar 28 and the construction of the carriage 14.

Figure 6:
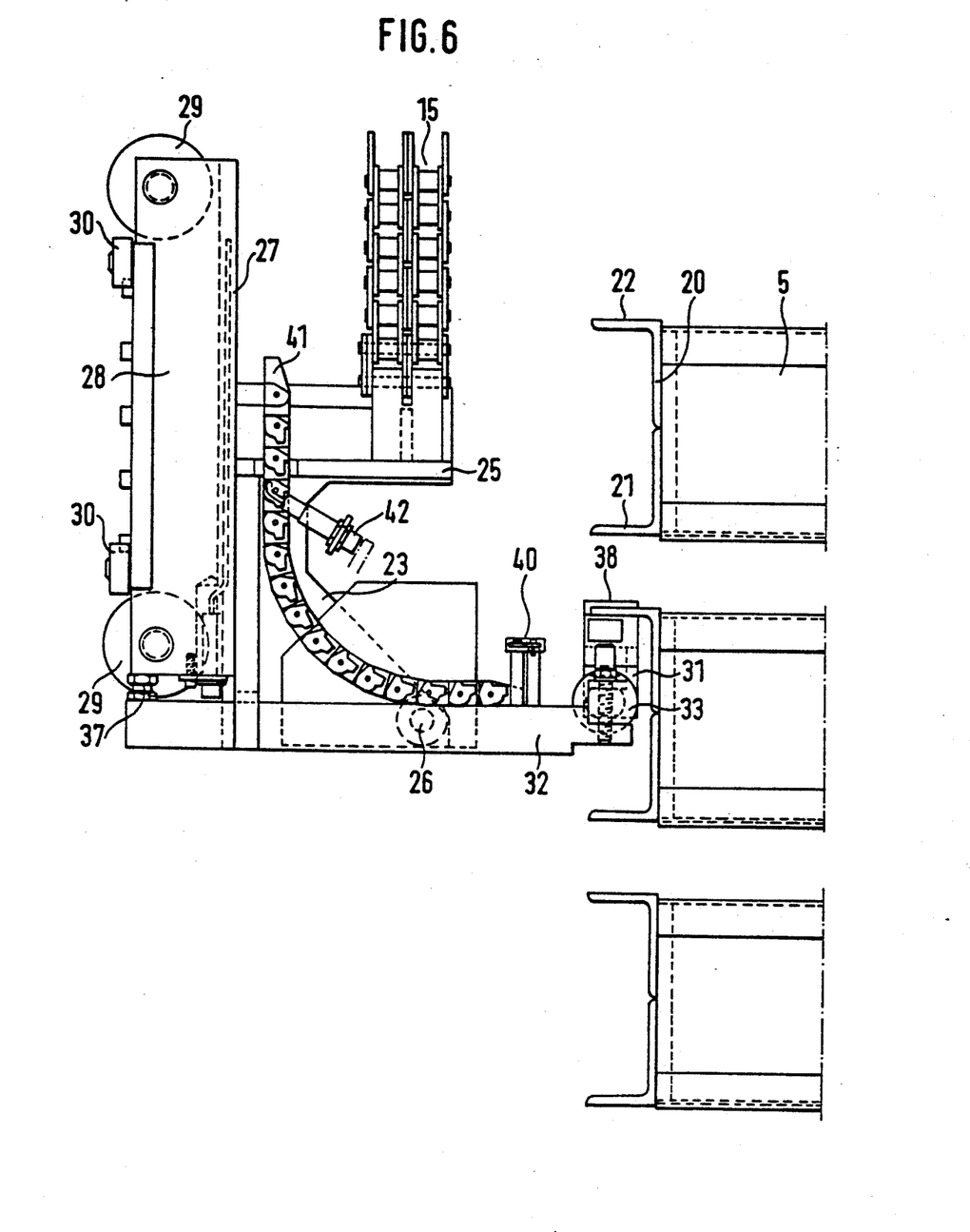
FIG. 6 shows an elevation of the carriage of the carrier bracket according to FIGS. 4 and 5, the toothed segment and its drive according to FIG. 5 being omitted.

FIG. 6 shows a section, lying still further to the rear than FIG. 5, omitting the guide rail 18 and the outer shelving supports 2 and the carrier arms 4. Here, as also visible in FIG. 5, it can be seen that the longitudinal bar 32 is provided at its end remote from the shelving unit with an adjustable stop 37 in the form of a screw with which it can come to abut against the bar 28, for the adjustment of the horizontal position of the carrier bracket 14.

Figure 9:
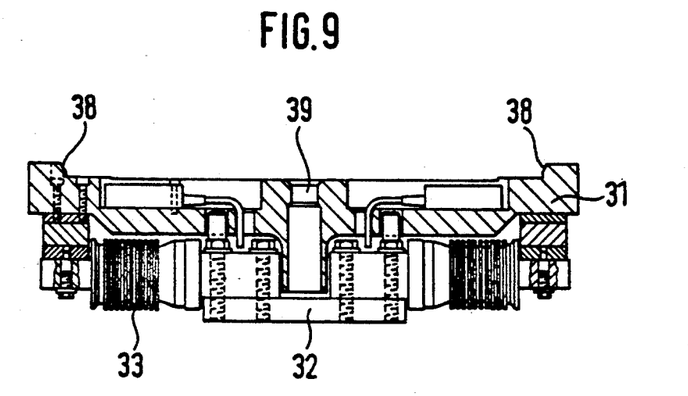
FIG. 9 shows a sectional view of the carrier bracket according to the section line IX—IX in FIG. 7.
Figure 10:
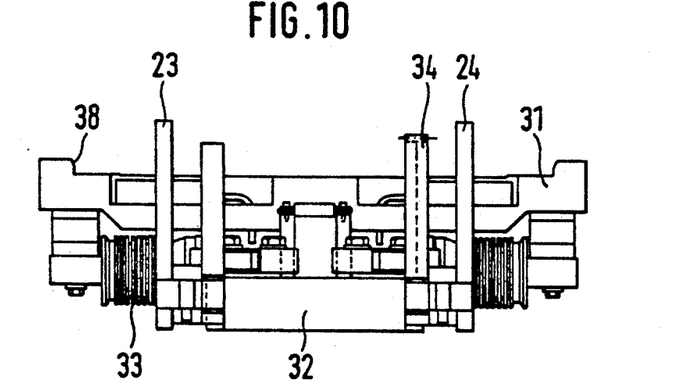
FIG. 10 shows a sectional view of the carrier bracket according to the section line X—X in FIG. 7.

As may be seen especially in FIGS. 9 and 10, the forward cross-bar 31 has means at its two ends for adjustment of the magazines 5 in the longitudinal direction of the storage space of these means being made in the form of upwardly projecting noses. Furthermore, the middle of the forward cross-bar 31 has a centering bore 39 for the load cross-piece 16 which may be seen from FIG. 2, while—as visible by way of example in FIG. 6—the longitudinal bar 33 carries electrical connections 40 in order to supply the cross-member 15 with power, especially electrical power, for the operation of light gates or barriers or the like.

In FIG. 6, especially, a link chain 41 of known kind can further be seen which serves as a guide for the feed of electrical power, compressed air or the like to the carrier bracket 14.

FIG. 6 also shows an adjustable stop 42 by which the upwardly hinged position of the carrier bracket 14, illustrated in FIG. 11, is adjustable.

FIG. 7 illustrates the guide profile rail 18, as guided on a vertical rail 43 on the respective crane support 8. Rollers 44, 45 guide the rail 18, with respect to both the longitudinal direction of the storage space as well as transversely thereto.

FIG. 2 shows a machine 46 arranged beside the storage arrangement for the further processing of the material in rod form, for example a cold circular saw, which can be served from the station 12 according to FIG. 3 for putting material into and out of store.

I claim:

1. Shelf servicing apparatus having a movable gantry crane (8, 9) for servicing a material store for rod material located, optionally, in pallet boxes or magazines (5) or directly on a material support beam (16),
   wherein the material store has
   a plurality of stacking frames (2), each defining a storage space direction, at least two of said stacking frames being laterally spaced and separated from one another, the space between said stacking frames defining a lane (1) for material transport,
   each of said stacking frames including
   vertical shelving supports (2, 3) and a plurality of carriers arms (4) secured on at least two of said shelving supports (2, 3), located one above another, and
   projecting into the lane and secured on said vertical shelving supports, at least two vertically arranged carrier arms defining a shelving unit or compartment for supporting said rod-like material or, optionally, said pallet boxes or magazines (5) on at least two of said arms (4);
   said gantry crane (8, 9) bridging over the material store, and being movable in the storage space direction,
   said gantry crane including
   vertical crane supports (8);
   carriage means (17) movably retained on said crane supports (8) for movement up or down on said crane supports;
   carrier brackets (14) secured to said carriage means, said carrier brackets extending horizontally into a vicinity of the material store for moving said material, or said pallet boxes, selectively, up and down upon movement of said carriage means,
   and wherein the improvement comprises that
   said carrier brackets (14) are essentially of T-shaped form, to define a T-shaped carrier bracket (31) having a transverse bar and a longitudinal portion (32),
   wherein the transverse bar of the T bracket defines a load carrying cross-piece, forming a carrier beam adapted for engagement with end portions of the pallet boxes or magazines, and optionally with said material support beam;
   a pivot means (26) pivotably mounting the longitudinal portion (32) of the T bracket on said carrier means (17) for selective pivotable movement of said T-bracket portion into and out of the space occupied by said shelving units and thus, when moved out of the space occupied by a respective shelving unit, permit movement of the carriage means (17), selectively, without engagement with the pallet box or magazine or the material support beam; and
   operating means (36) operatively coupled to the longitudinal portion (32) of the T bracket for said pivotable movement thereof.

2. The apparatus of claim 1, wherein a pivot axis of the pivot means (26) is essentially horizontal.

3. The apparatus of claim 1, wherein said pivot means (26) permit essentially vertically upwardly pivotable movement of the T brackets to move the T-bracket portion out of the space occupied by the shelving units.

4. The apparatus of claim 3, including a stop screw (37) adjustably and securably arranged on the longitudinal portion (32) of the T-bracket, so that, when the carrier bracket is pivoted in a horizontal position, the stop screw is in stopped abutment on the carriage means (17).

5. The apparatus of claim 1, wherein the shelving supports (2) are, in horizontal cross section, substantially flat transversely of the storage space direction, and are arranged in the storage space direction partially to cover end portions of the shelving compartments formed by the carrier arms.

6. The apparatus of claim 1, wherein said pivot means (26) permit the carrier brackets to pivotably move upwardly through about 90°.

7. The apparatus of claim 1, wherein the T bracket (31) is provided at both ends with noses (38) for lateral adjustment with respect to the magazines (5) or material support beam (16).

8. The apparatus of claim 1, characterized in that the longitudinal portion (32) of the T-bracket of the carrier brackets (14) comprise further means (38) for adjustment with respect to the material support beam (16) in a longitudinal direction of the material.

9. Apparatus according to claim 1, characterized in that the carriage means (17) comprises two vertical side pieces (23, 24), the carrier bracket (14) being arranged between the side pieces and pivotably mounted therebetween; and a hoist means (15) is provided for hoisting the carriage means (17), coupled to the side pieces.

10. The apparatus of claim 1, wherein guide sections (18) are provided, vertically movably located and guided on the crane supports (8);
   at least one of the carriage means (14) being located on and movable vertically on the guide sections (18);
   a carriage stop means (18a) limiting mobility of the carriage at an upper end of the guide section; and
   a support stop means (8a) limiting mobility of the guide section so that it cannot be moved completely downwardly and out of guidance from its crane support.

11. The apparatus of claim 1, further including a toothed segment (34) with an angle of more than 90° located on the longitudinal portion (32) of the carrier bracket (14) and positioned outside of the shelving units;
   a rack (35) located on the carriage (17) and in engagement with the toothed segment; and
   wherein said operating means (36) comprises a drive means coupled to the rack and vertically moving the rack, and thereby rotating said segment.

* * * * *